United States Patent [19]

Riber

[11] 4,034,556
[45] July 12, 1977

[54] ARRANGEMENT FOR CONTROLLING THE ENGAGEMENT OF A CHAIN WITH A CHAIN SHEAVE, SUCH AS A CABLE LIFTER OR WILDCAT

[75] Inventor: Simon Riber, Arendal, Norway

[73] Assignee: A/S Pusnes Mekaniske Verksted, Arendal, Norway

[21] Appl. No.: 633,820

[22] Filed: Nov. 20, 1975

[30] Foreign Application Priority Data

Nov. 25, 1974 Norway .............................. 744220

[51] Int. Cl.² .......................................... F16G 13/18
[52] U.S. Cl. ........................................ 59/78; 59/84; 59/93; 74/250 R; 114/294
[58] Field of Search ............... 59/84, 78, 93, 80, 8; 114/206 R, 235 R, 235 A, 230; 74/250 R, 250 S, 245 R, 245 S

[56] References Cited

U.S. PATENT DOCUMENTS

| 1,141,869 | 6/1915 | Douglas | 74/250 R |
| 3,842,776 | 10/1974 | Wudtke | 114/206 R |

FOREIGN PATENT DOCUMENTS

| 857,602 | 12/1952 | Germany | 74/245 R |
| 11,357 | 5/1896 | United Kingdom | 59/78 |

Primary Examiner—C.W. Lanham
Assistant Examiner—Gene P. Crosby
Attorney, Agent, or Firm—Watson, Cole, Grindle & Watson

[57] ABSTRACT

A chain link, which is asymmetric about its longitudinal axis, one longitudinal side of the link being convex, the other being concave, or a plurality of such links alternating with common type links, is used for twisting the chain into predetermined synchronization with the pockets and teeth (whelps) of a chain sheave (cable lifter, wildcat), particularly as applied to a chain and a rope interconnected by a coupling link larger than a common link.

6 Claims, 7 Drawing Figures

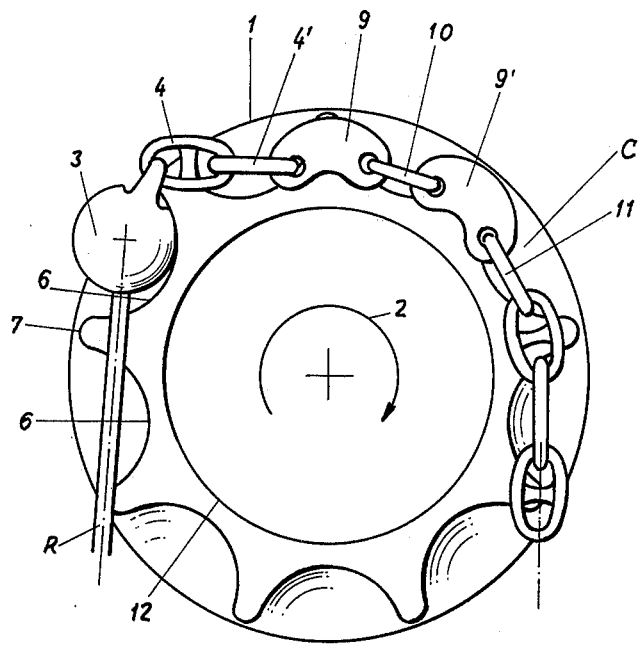
Fig.1
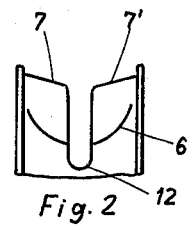
Fig.2
Fig.7
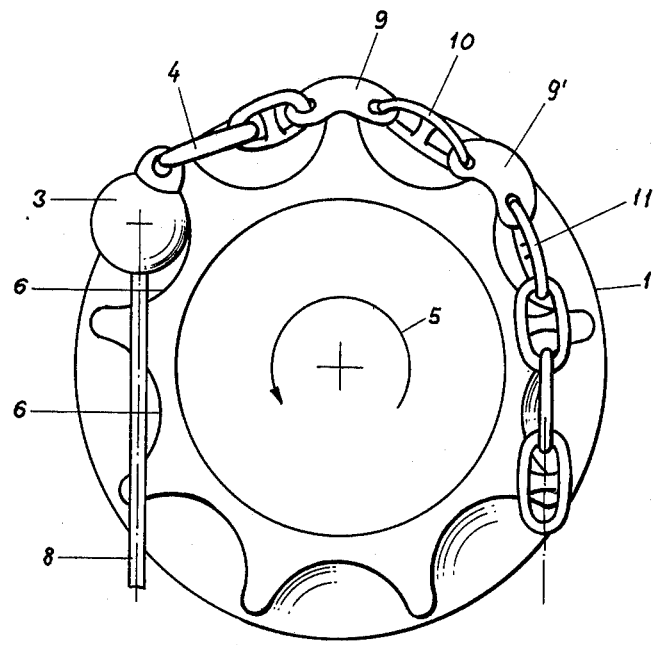
Fig.3
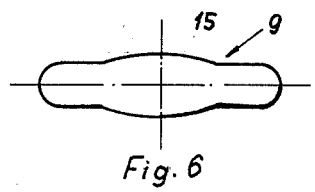
Fig.6
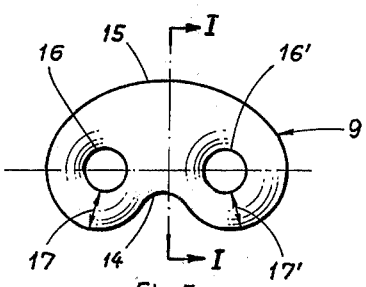
Fig.5
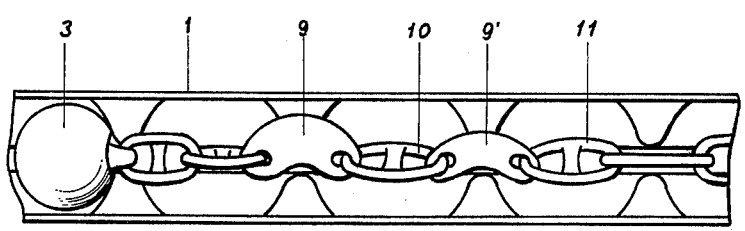
Fig.4

ARRANGEMENT FOR CONTROLLING THE ENGAGEMENT OF A CHAIN WITH A CHAIN SHEAVE, SUCH AS A CABLE LIFTER OR WILDCAT

BACKGROUND OF THE INVENTION

This invention relates to an arrangement for controlling the engagement of a chain with a chain sheave (cable lifter, wildcat) by twisting the chain if a link in horizontal position engages the teeth (whelps) of the sheave instead of entering into its pockets. The expressions "horizontal" and "vertical" as applied to chain links are customarily used within the art to indicate the position of the link relative to a chain sheave.

A particularly important use of the invention is for solving the problems arising where a line to be passed around a chain sheave besides a common chain comprises an enlarged link, such as a special coupling or splicing link, requiring to be engaged with the chain sheave in a predetermind position with respect to the pockets and teeth of the chain sheave, and where the fulfillment of this requirement depends on correct orientation of the adjacent chain link, either vertial or horizontal depending on the geometrical conditions.

When the chain has entered the chain sheave with the splicing link in incorrect position, the problem has been solved by turning the chain while this is in engagement with the chain sheave, but this is very difficult and complicated with the great anchor chain dimensions used on ships and oil drilling platforms.

For the splicing of chains there have therefore been constructed relatively complicated so-called Kenter shackles, which can pass the chain sheave in both vertical and horizontal position, the distance between opposed teeth of the sheave being made as great as possible. An ordinary shackle, which is likewise frequently used for the splicing of chains, can only pass such a sheave in horizontal position.

For the interconnection of a chain and a fibre or steel rope, it has not been found possible to construct a coupling having dimensions such as to permit the coupling link to pass between opposed teeth of a chain sheave. For semi-submersible oil drilling platforms, the combination of a chain and a rope as a mooring line has many advantages, but one of the difficulties encountered is that of ensuring correct engagement of the coupling link with the chain sheave during its passage around the latter.

When the rope is hauled in by means of a separate winch, but on its way is guided around the chain sheave in the groove of the latter, the operator will see to it that the coupling link will be landed in a pocket of the sheave, but the orientation of the chain about its longitudinal axis is not under control. After some time the chain will synchronize itself with the chain sheave, but in this process of synchronization the chain will be displaced relative to the circumference of the chain sheave, and therefore when, during pay-out, the coupling link returns to the sheave, it may land on a pair of teeth or in a pocket of the sheave depending on the orientation at which the chain entered into engagement with the sheave during haul-in.

SUMMARY OF THE INVENTION

The invention relates to a special link structure and combination whereby the chain is automatically twisted so as to assume correct orientation when the special link structure follows the coupling link into the chain sheave. The main feature of the invention is the provision of a chain link which is asymmetric about its longitudinal axis, one longitudinal side of the link being convex, the other being concave. If one or more of the links at the front end of the chain, which must be vertical in order to make the coupling link assume the same position as before when returning to the chain sheave during pay-out, do not during haul-in enter in vertical position between the opposed teeth of the sheave, they will be turned to this position owing to their asymmetric shape. The principle may, however, find general application where a chain with arbitrary angular orientation enters a chain sheave. One or more chain links have an asymmetric shape, as above defined, such that when landing in horizontal position on a pair of teeth of a chain sheave they will tend to rotate to vertical position. Since every second chain link is horizontal when the chain passes around a chain sheave, every seconk link will be given the special shape, if more than one such link is used. As compared with a common chain link, the special chain link according to the invention is asymmetric about its longitudinal axis. For an anchor chain, the term "common link" is precisely defined e.g. in the regulations of the classification agencies. In the chain link according to the invention one longitudinal side is made concave in order to slide along the respective tooth so as to press the other side higher up on the opposed tooth so that the chain is turned about its longitudinal axis. If the other side is made more convex than that of a common chain and/or the portion of the link on the convex side has a thickness greater than that of a common link, the tendency to rotation will be promoted. The twisting of the chain will be limited by the extent to which the individual links can rotate relative to one another. It is therefore preferable to make the diameter of curvature of the surface of engagement of the asymmetric link greater than that of a common link.

In a preffered embodiment of the invention, the asymmetric chain link takes the form of a solid body with two holes for the engagement of neighbour links. For the reasons explained above the holes will then have a diameter greater than the diameter of curvature of the engagement surface of a common link.

BRIEF DESCRIPTION OF THE DRAWINGS.

FIG. 1 shows diagrammatically, the front view, a chain sheave with a line passing around same during pay-out, the line comprising a chain constructed in accordance with the invention and connected with a rope by means of a coupling link, FIG. 2 is a radial cross-section through the rim portion of the chain sheave of FIG. 1, FIG. 3 shows the same parts as FIG. 1 during haul-in where the chain link following the coupling link has landed in horizontal position on a pair of opposed teeth of the chain sheave, FIG. 4 is a developed top view corresponding to FIG. 3, FIG. 5 shows one form of an asymmetric chain link according to the invention in front view, FIG. 6 is a top view of a section of the link of FIG. 5, and FIG. 7 is a section of the link of FIG. 5 along the line I—I.

DESCRIPTION OF THE PREFERRED EMBODIMENT

FIG. 1 shows a chain sheave 1 which rotates in the clockwise direction during pay-out of a mooring or anchoring line consisting of a rope R and a chain C interconnected by means of a coupling link 3 which is of generally spherical configuration and may e.g. be of the type described in the copending application Ser. No. 559,774 of Krogstad and Ødegård, filed on Mar. 19, 1975, now Pat. No. 3,977,181. As will be seen, the coupling link has been landed correctly in a pocket 6 of the chain sheave owing to the fact that the chain C is oriented in the chain sheave in such a manner that the chain link 4 linked to the coupling link 3 is in vertical position, every second one of the following chain links 9, 9' being likewise in vertical position. If the chain had been turned 90° with the links 4, 9, 9' horizontal and present in pockets, the coupling link 3 would have landed on the top of two opposed teeth 7, 7'. In that case the deviation of the rope R from the longitudinal axis of the coupling link would have been beyond the permissible limits, so that the rope would be subjected to friction and bending stresses.

FIG. 2 is a section through the sheave showing its bottom groove 12, a pocket 6 and a pair of opposed teeth 7, 7'.

FIGS. 3 and 4 illustrate the function of the arrangement according to the invention, both illustrating the same situation during haul-in as viewed from different angles. FIG. 3 shows the chain sheave rotating in the counter-clockwise direction, the coupling link 3 having been received in a pocket when it first entered the chain sheave, which was at that time not driven, since at that stage haul-in was performed by a separate rope winch. However, at the time of engagement of the angular position of the coupling link about its longitudinal axis was not under control, and in the situation illustrated, the adjacent chain link 4 and links number three 9 and number five 9' have landed in horizontal position on the top of teeth 7, 7' as illustrated. If all the links had been common links, the chain would probably have synchronized itself with the sheave after some time without twisting, and it would then have been so displaced relative to the circumference of the sheave, that upon rotation of the chain sheave in the opposite direction during pay-out, the first link 4 would land in horizontal position in a pocket, and the coupling link 3 would therefore land on top of a pair of teeth 7, 7'.

FIGS. 3 and 4 illustrate how the first asymmetric link 9, when landing in horizontal position, immediately tends, owing to its special configuration, to rotate towards vertical position, and the next following asymmetric link 9' will complete the twisting, so that the next link 11 is approximately horizontal and located in a pocket. When the sheave subsequently rotates the other way, the asymmetric links 9, 9' will be vertical, and the correctly synchronized situation as illustrated in FIG. 1 will exist.

In order to improve the engagement of the asymmetric links 9, 9' with the teeth for causing rotation of these links, the latter may advantageously have a greater length than the common links of the chain, the length of the common type adjacent and intervening links 4, 4', 10 and 11 being then chosen correspondingly smaller than that of a common link so as to make the total length of the string of links, 4, 4', 9, 10, 9', 11 approximately equal to that of a string of the same number of common links.

FIGS. 5–7 show the configuration of an asymmetric chain link according to one embodiment of the invention. One longitudinal side 14 is concave, and the other longitudinal side 15 is more convex than that of a common link. The convex portion of the link has a somewhat greater thickness than that of a common link. The link is in the form of a solid body having holes 16, 16' which are somewhat larger than the rounded stock at the ends of a common link. Disregarding the convex portion, the diameter of curvature of the surface of engagement of the link 17, 17' is approximately the same as a common link.

I claim:

1. The combination of a coupling link requiring to be engaged with a chain sheave in a predetermined position with respect to the pockets and teeth of the chain sheave, and a chain comprising chain links of the common type of a configuration suitable for the normal functions of an anchoring or mooring chain and further comprising at least one chain link which is asymmetric about its longitudinal axis, one longitudinal side of the link being convex, the other longitudinal side being concave, the asymmetric link or links being so placed in the chain such that when the asymmetric links are engaged in vertical orientation between opposed teeth of the sheave, said coupling link will assume said predetermined position.

2. The combination of claim 1, in which the convex longitudinal side of the asymmetric link or links is more convex than that of the common links.

3. The combination of claim 1, in which the position of the asymmetric link or links on the convex side has a thickness greater than that of the common links.

4. The combination of claim 1, in which a diameter of curvature of the surface of engagement of the asymmetric link or links is greater than that of the common links.

5. The combination of claim 1, in which the asymmetric link or each asymmetric link consists of a solid body with two holes for the engagement of neighbour links.

6. The combination of claim 1, in which the length of the asymmetric link or links is greater than that of the common links, and the chain further comprises interconnecting links of the same general configuration as the common chain links, but having a shorter length to compensate for the greater length of the asymmetric link or links.

* * * * *